C. R. CANTRELL.
DEMOUNTABLE RIM FOR PNEUMATIC TIRES.
APPLICATION FILED NOV. 23, 1912.
1,076,744. Patented Oct. 28, 1913.
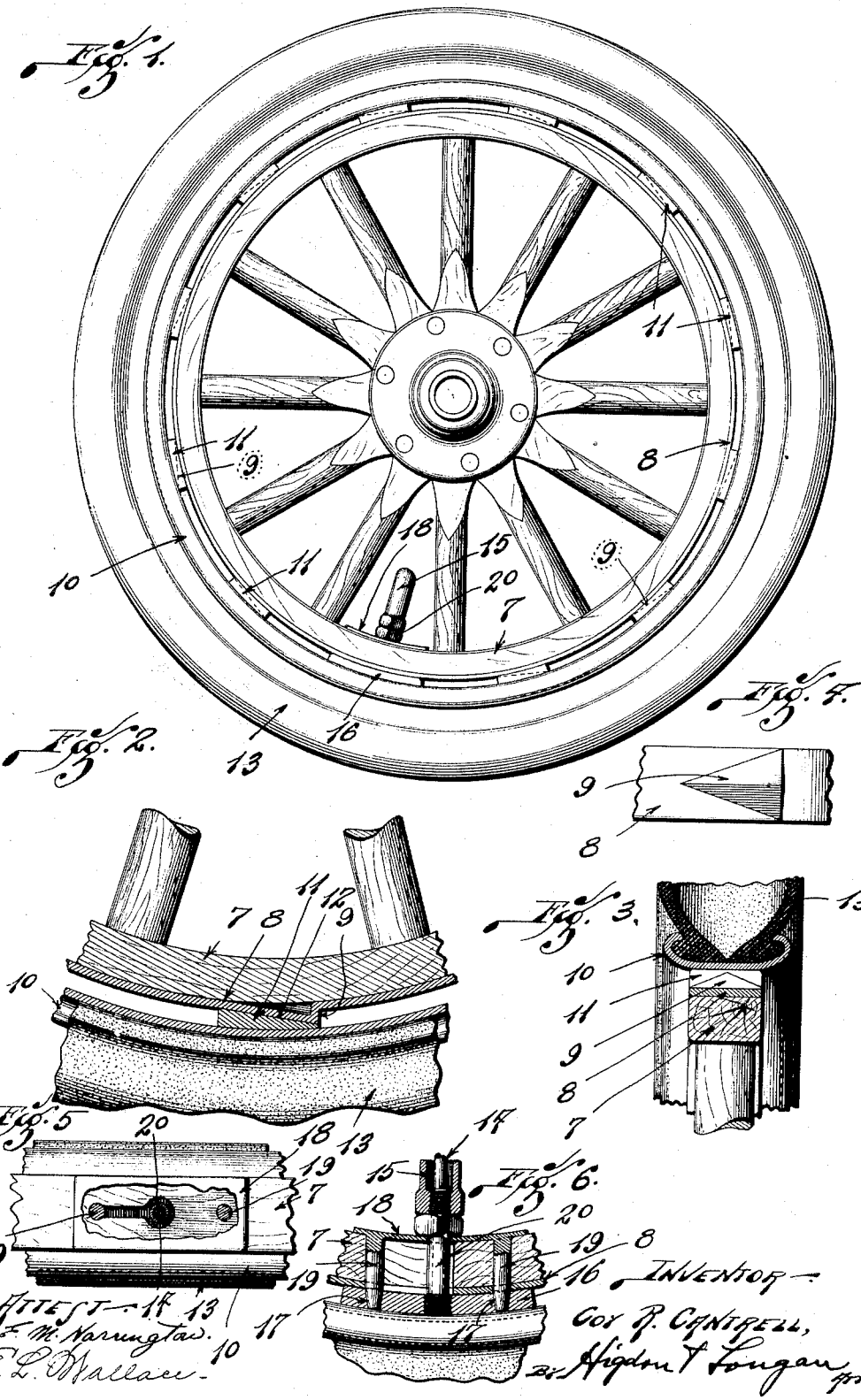

UNITED STATES PATENT OFFICE.

COY RICHARD CANTRELL, OF ST. LOUIS, MISSOURI.

DEMOUNTABLE RIM FOR PNEUMATIC TIRES.

1,076,744.    Specification of Letters Patent.    Patented Oct. 28, 1913.

Application filed November 23, 1912. Serial No. 733,189.

*To all whom it may concern:*

Be it known that I, COY R. CANTRELL, a citizen of the United States, and resident of St. Louis, Missouri, have invented certain new and useful Improvements in Demountable Rims for Pneumatic Tires, of which the following is a specification containing a full, clear, and exact description, reference being had to the accompanying drawings, forming a part hereof.

My invention relates to improvements in demountable rims for pneumatic tires, and the object of my invention is to construct a rim in such manner that it may be detached from the wheel by a relative rotary movement, and further to construct a means to secure the rim against rotary movement relative to the wheel. By such a construction I may dispense with the usual locking wedges and bolts.

With the above purposes in view my invention consists in certain novel features of construction and arrangement of parts as will be hereinafter more fully described, pointed out in the claim and illustrated by the accompanying drawings, in which—

Figure 1 is a side elevation of a wheel and tire provided with my improved demountable rim; Fig. 2 is a longitudinal sectional elevation through a portion of the wheel felly and the demountable rim; Fig. 3 is a vertical sectional elevation through the wheel felly and rim; Fig. 4 is a plan of a portion of the felly band; Fig. 5 is a fragmental plan showing a portion of the locking plate broken away and also illustrating the slot through which the valve-stem may move; and Fig. 6 is a vertical sectional elevation through the plate and pins shown in Fig. 5.

Referring by numerals to the accompanying drawings: 7 designates the felly of an ordinary automobile wheel. Secured to the periphery of the felly 7 is a metallic band 8. Arranged at uniform intervals on the band 8 are the projections 9, each of which inclines from a longitudinal median line downwardly toward the surface of the band, and each projection on the median line inclines from its rearmost end downwardly and forwardly to the surface of the band. As shown in Fig. 2, these projections 9 are preferably formed by being pressed out of the body of the band.

10 designates the tire rim, the form shown being of the clencher type. Secured to the inner face of the rim 10 are the uniformly spaced apart blocks 11, the spacing of the blocks being the same as the spacing of the projections 9 of the felly band. Formed in each of the blocks is a cavity 12 which is shaped to receive one of the projections 9, the cavities being deepest at their rearmost ends and inclining upwardly and outwardly from longitudinal median lines.

13 designates an ordinary pneumatic tire-casing which is secured in an ordinary manner in the rim 10.

14 designates the valve-stem for the inner tube (not shown), and 15 designates the valve-stem cap, the cap and stem each being of ordinary construction.

16 designates a block which is rigidly secured to the felly band. This block is provided with an opening through which the valve-stem 14 projects and on either side of the valve-stem opening there is a tapered opening 17.

18 designates a plate carrying a pair of pins 19, the lowermost ends of which are tapered to fit openings 17. These pins 19 project through a felly, through the band 8 and are firmly seated in the block 16 and serve the purpose of preventing a relative rotary movement between the felly and the rim.

20 designates a sleeve which is slipped over the stem 14 and is projected through openings formed in the plate 18, the felly 7 and the band 8, the lowermost end of the sleeve being threaded into the opening formed in the block 16. This sleeve is arranged to protect the valve-stem. One of the openings in the felly is slot-like extending from the point through which the valve-stem extends to the point where one of the locking pins 19 is extended through the felly, the slot permitting of a movement of the rim relative to the fixed valve-stem. When wholly assembled the cap 15 serves as a jam-nut to hold the sleeve 20 in place. The sleeve 20 and the cap 15 serve to prevent the plate 18 and pins 19 from moving out of place.

After the wheel has been assembled as shown and described, the operation of demounting the rim is as follows: The cap 15 is first removed and the protecting sleeve 20 withdrawn, thus releasing the plate 18 with the pins 19 so that the pins may be withdrawn. This leaves the rim free to be rotated relative to the felly band. By this arrangement rims carrying inflated tires may be readily detached from or attached to the vehicle wheels.

In order to dismount the rim from the felly the rim is rotated relative to the felly, thus freeing the projections 9 from the cavities 12 in the blocks 11 which are secured to the rim, the extent of the rotation being at least equal to the length of the blocks 11, so that the entire rim with the blocks may be moved laterally away from the felly band.

The advantage of the peculiar shape of the projections 9 is that by reason of their taper they may be more readily introduced to the cavities in the blocks 11, so that when applying the rim the projections 9 and tapering cavities 12 are practically self-centering.

I claim:

In a demountable rim for pneumatic tires, a wheel having spaced apart wedge-shaped peripheral projections, a rim having peripheral wedge-shaped cavities to receive the projections on the wheel, a locking block carried by the rim, a valve stem protecting sleeve secured to said block, a plate having a pin arranged to lock the wheel and said block against relative movements, and means for securing the plate in place, said wheel having a slot through which the sleeve is moved, substantially as shown and for the purposes stated.

In testimony whereof, I have signed my name to this specification, in presence of two subscribing witnesses.

COY RICHARD CANTRELL.

Witnesses:
BURTON BUNCH,
E. L. WALLACE.